United States Patent
Lee

(10) Patent No.: US 6,614,812 B1
(45) Date of Patent: Sep. 2, 2003

(54) COMPUTER TELEPHONY INTEGRATED MODULE SYSTEM

(75) Inventor: Dong-Youl Lee, Chungju (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/377,861

(22) Filed: Aug. 20, 1999

Related U.S. Application Data

(63) Continuation-in-part of application No. 08/773,503, filed on Dec. 23, 1996.

(30) Foreign Application Priority Data

Dec. 23, 1995 (KR) ............................................ 95/55739

(51) Int. Cl.⁷ .................................................. H04J 3/12
(52) U.S. Cl. ...................................... 370/524; 370/352
(58) Field of Search .............................. 370/351–358, 370/264, 395.3, 401, 402, 419, 465, 467, 487, 493–495, 524; 379/399.01

(56) References Cited

U.S. PATENT DOCUMENTS

| | | | |
|---|---|---|---|
| 4,922,484 A | | 5/1990 | Yoshida et al. |
| 4,961,185 A | | 10/1990 | Sawada |
| 5,067,125 A | * | 11/1991 | Tsuchida ..................... 370/79 |
| 5,133,006 A | | 7/1992 | Khuat |
| 5,204,860 A | | 4/1993 | Sparks |
| 5,222,130 A | | 6/1993 | Pflueger et al. |
| 5,276,687 A | | 1/1994 | Miyamoto |
| 5,278,665 A | | 1/1994 | Sawada et al. |
| 5,283,827 A | | 2/1994 | Conforti et al. |
| 5,305,312 A | | 4/1994 | Fornek et al. |
| 5,305,377 A | * | 4/1994 | D'Arcy et al. ............... 379/399 |
| 5,319,700 A | * | 6/1994 | Mano et al. ................... 379/94 |
| 5,341,418 A | | 8/1994 | Yoshida |
| 5,426,692 A | | 6/1995 | Fujise |
| 5,450,412 A | * | 9/1995 | Takebayashi et al. ...... 370/95.1 |
| 5,450,486 A | | 9/1995 | Maas et al. |
| 5,459,788 A | | 10/1995 | Kim |
| 5,467,395 A | | 11/1995 | Izumi |
| 5,481,605 A | | 1/1996 | Sakurai et al. |
| 5,621,731 A | | 4/1997 | Dale et al. |
| 5,638,373 A | | 6/1997 | Takebayashi et al. |

FOREIGN PATENT DOCUMENTS

GB                2261573 A      5/1993

* cited by examiner

*Primary Examiner*—Ajit Patel
*Assistant Examiner*—Brenda Pham
(74) *Attorney, Agent, or Firm*—Robert E. Bushnell, Esq.

(57) ABSTRACT

A computer telephony integrated module system which connects peripheral devices to one another without using an additional modem port includes at least: a CPU (central processing unit), the CPU receiving two audio channel signals generated by a digital simple exchange system and data channel signals and outputting respective control signals for controlling three elements (i.e., a computer, a telephone, and a peripheral device); a first controller for receiving the audio channel signals and the data channel signals, dividing them into first and second audio channel signals, and providing the data channel signals to the CPU; a second controller for connecting the first audio channel signal to the digital telephone in response to one of the control signals; a third controller for converting the second audio channel signal to an analog signal and connecting the analog signal to a peripheral device in response to another of the control signals; and a computer interface for receiving still another one of the control signals comprising a first data channel signal for controlling the computer and for connecting the first data channel signal to the computer.

10 Claims, 1 Drawing Sheet

COMPUTER TELEPHONY INTEGRATED MODULE SYSTEM

CROSS-REFERENCE TO RELATED APPLICATIONS

This application is a continuation-in-part of Applicant's Ser. No. 08/773,503, filed in the U.S. Patent & Trademark Office on Dec. 23, 1996.

CLAIM OF PRIORITY

This application makes reference to, incorporates the same herein, and claims all benefits accruing under 35 U.S.C. §§119 and 120 from an application for COMPUTER TELEPHONY INTEGRATED MODULE SYSTEM earlier filed in the Korean Industrial Property Office on the 23$^{rd}$ day of December 1995 and there duly assigned Serial No. 55739/1995.

BACKGROUND OF THE INVENTION

1. Field of the Invention

The present invention relates generally to integration of telephone control, and more particularly, to an computer telephony integrated module system for controlling a telephone and peripheral devices through a computer.

2. Description of the Related Art

A digital telephone, a modem (or a facsimile machine), and a personal computer (hereinafter referred to as a PC) are connected to a digital simple exchange system, and therefore their functions can be independently performed. When a modem (or facsimile machine) and the personal computer are connected to a digital extension, the modem and the personal computer are connected through an additional interface module.

Accordingly, as described above, the digital telephone, the modem (or facsimile machine), and the personal computer are respectively connected to the digital simple exchange system. Therefore, if the user wants to use the modem (or facsimile machine) while the digital telephone is in on-line state, it is troublesome that the user should set it by using an additional modem port.

The patents to Izumi, Kim, D'Arcy et al., and Sakurai et al., U.S. Pat. Nos. 5,467,395, 5,459,788, 5,305,377, and 5,481,605, respectively entitled Telephone Exchange Apparatus, Apparatus For Interfacing Analog Telephone In ISDN Terminal Adapter, Apparatus For Providing An ISDN to Analog Interface, and Private Branch Exchange Capable Of Analyzing Information Received From ISDN, each disclose an interface system for interfacing and ISDN line with three or more analog and digital elements. However, these references fail to teach or suggest the specifically recited features of the present invention.

The following additional patents also disclose features in common with the present invention, but are not believed to be as pertinent as the referenced noted above: U.S. Pat. No. 4,961,185 to Sawada, entitled Method For Controlling A Terminal Equipment Coupled To An Integrated Services Digital Network And A Terminal Equipment Based On The Same, U.S. Pat. No. 5,450,486 to Maas et al., entitled Telecommunication System And A Linecard, U.S. Pat. No. 5,341,418 to Yoshida, entitled ISDN Terminal Adapter For Access From Analog Signal Equipment Of Four Wire Full Duplex Type To ISDN, U.S. Pat. No. 5,283,827 to Conforti et al., entitled Digital Line Card For Interfacing A Remotely Located Digital Telephone To A Central Office System, U.S. Pat. No. 5,278,665 to Sawada et al., entitled Facsimile Machine Using ISDN Basic interface, U.S. Pat. No. 5,222,130 to Pflueger et al., entitled Message Arrangement And Method For Implementing A Digital Telephone System, U.S. Pat. No. 5,133,006 to Khuat entitled Combination Interface Circuit For Coupling A Digital Loop Carrier Telephone System, U.S. Pat. No. 4,961,185 to Sawada, entitled Method For Controlling A Terminal Equipment Coupled To An Integrated Services Digital Network And A Terminal Equipment Based On The Same, U.S. Pat. No. 5,305,312 to Fornek et al., entitled Apparatus For Interfacing Analog Telephones And Digital Data Terminals To An ISDN Line, U.S. Pat. No. 5,204,860 to Sparks, entitled Network Terminating Terminal Apparatus For Integrated Services Digital Network, and U.S. Pat. No. 5,276,687 to Miyamoto, entitled Network System Having Different Attributes Of Terminal Equipment Devices.

SUMMARY OF THE INVENTION

Accordingly, the present invention is directed to a computer telephony integrated module system that substantially obviates one or more of the problems due to the limitations and disadvantages of the related art.

An object of the present invention is to provide a computer telephony integrated module system which connects peripheral devices to one another without using an additional modem port.

Another object of the present invention is to provide a computer telephony integrated module system in which a digital telephone, a modem (or facsimile machine), and a personal computer are connected to one module, thereby effectively controlling a phone call by using the PC.

In order to achieve these objects and others, the present invention can be achieved with a computer telephony integrated module system constructed with, at least, a central processing unit receiving both audio channel signals generated from a digital simple exchange system and data channel signals and outputting respective control signals for controlling three elements (i.e., a computer, a telephone, and a peripheral device), with a first controller for receiving the audio channel signals and the data channel signals, dividing them into two audio channel signals (i.e., the first audio channel signal and the second audio channel signal), and providing the data channel signals to the central processing unit; a second controller for connecting the first audio channel signal to the digital telephone in response to one of the control signals; a third controller for converting the second audio channel signal into an analog signal and connecting the analog signal to a general telephone in response to another of the control signals; and a computer interface for receiving still another of the control signals comprising a first data channel signal for controlling the computer and for connecting the first data channel signal to the computer.

BRIEF DESCRIPTION OF THE DRAWING

A more complete appreciation of the invention, and many of the attendant advantages thereof, will be readily apparent as the same becomes better understood by reference to the following detailed description when considered in conjunction with the accompanying drawing which is a block diagram illustrating the construction of a computer telephony integrated module system for controlling a telephone and peripheral devices through a computer in accordance with a preferred embodiment of the present invention.

DETAILED DESCRIPTION OF THE PREFERRED EMBODIMENT

Figure 1:
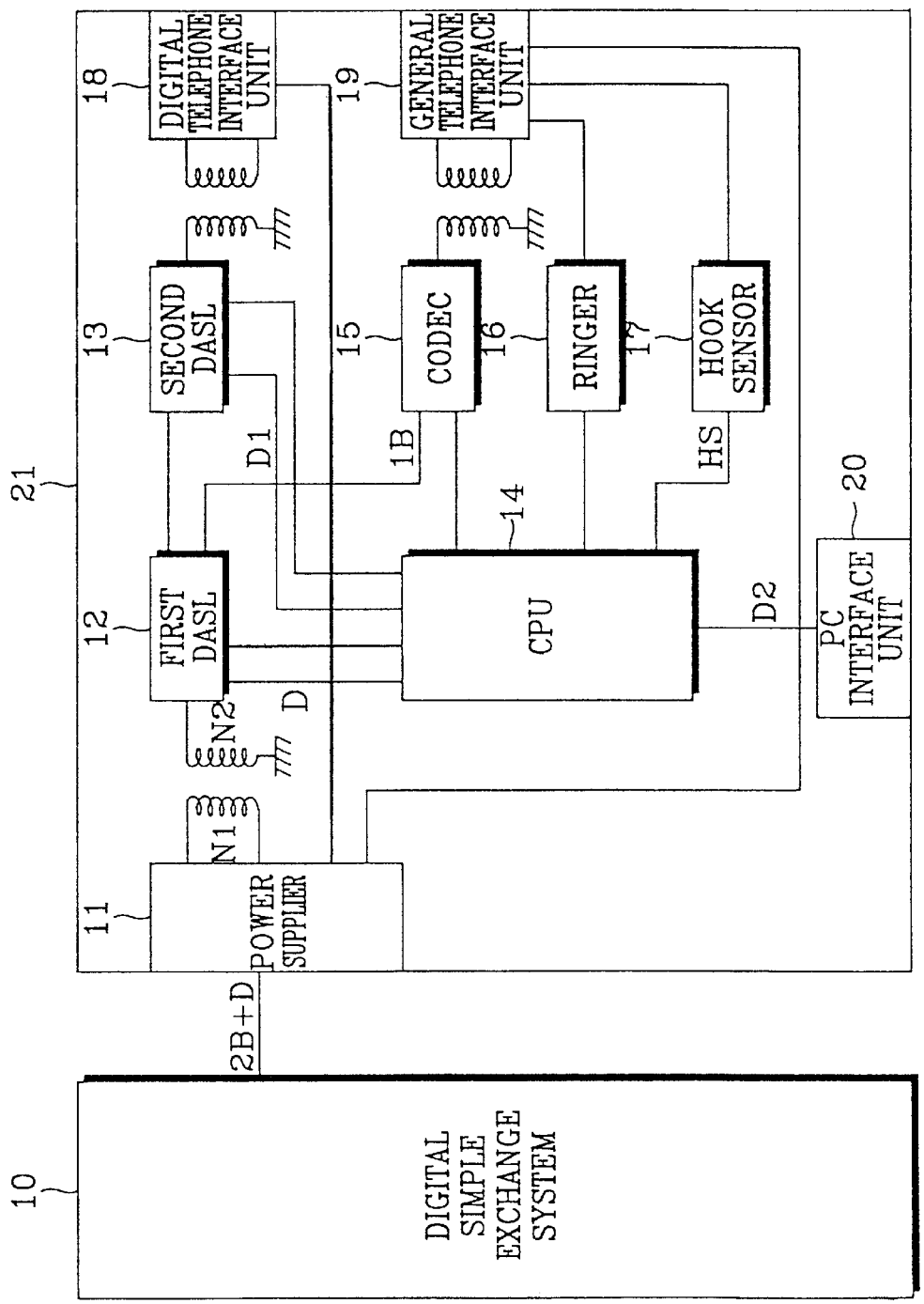

Reference will now be made in detail to the preferred embodiment of the present invention, an example of which are illustrated in the accompanying drawing.

As shown in the drawing, a computer module system 21 may be constructed with a power supplier 11 for receiving two audio channel signals 2B and a data channel signal D through a digital simple exchange system 10; a first DASL (digital adapter subscriber for loops) 12 for receiving the two audio channel signals 2B and the data channel signal D by turn-ratios N1 and N2; a second DASL 13 which is connected to the first DASL 12, for transmitting one audio channel signal 1B between the two audio channel signals 2B to a digital telephone interface unit 18; a CODEC (coder-decoder) 15 for converting another audio channel signal 1B to an analog signal and connecting it to a general telephone interface unit 19; a ringer 16 for outputting a ring to the general telephone interface unit 19; a personal computer interface for connecting a data channel signal D2 to a personal computer interface unit 20; and a CPU 14 for controlling the aforementioned operations. In addition, the computer module system 21 uses a power supplier 11 which receives a power-supply from the digital simple exchange system 10, generates a necessary voltage, and provides the power-supply to both the digital telephone and the general telephone; and a hook sensor 17 of the general telephone.

The first DASL 12 receives two audio channel signals 2B and the data channel signal D from the digital simple exchange system 10, connects one audio channel signal 1B to the digital telephone through the second DASL 13 (i.e., through a digital telephone interface unit 18), and determines a voice path. The first DASL 12 transmits another audio channel signal IB generated by the first DASL 12 to the CODEC 15. Accordingly, the signal IB is converted to an analog signal in the CODEC 15, and is then connected to an audio signal of the general telephone (through a general telephone interface unit 19), thereby determining a voice path of the general telephone.

A data command between the digital simple exchange system 10 and the computer telephony integrated module system 21 uses the data channel signal D. That is, the first DASL 12 receives the two audio channel signals 2B and the data channel signal D, and connects the data channel signal D to the CPU 14. Further, a data command between the computer telephony integrated module system 21 and the digital telephone interface unit 18 is achieved by the second DASL 13 using a data channel signal D1 generated from the CPU 14. The ringer 16 generates a ring signal of the general telephone. The hook sensor 17 connected between the CPU 14 and the general telephone interface unit 19 detects a hook on/off of the general telephone.

To achieve communication between the computer telephony integrated module system 21 and the PC, data of the CPU 14 are converted to a RS-232C signal, and the CPU 14 is then connected to the PC. The CPU 14 entirely controls the aforementioned operations. Herein, the modem or the facsimile machine is connected to a general telephone port. As a result, for communication therebetween a general calling uses with the digital telephone, and a document or other data uses the modem or the facsimile. In this case, the overall call control are achieved by using the PC, so that call environment for an office can be conveniently improved.

The CPU 10 of the present invention is used to control the call of the peripheral device such as an analog telephone, a digital telephone, etc. When the status of the peripheral device changes, e.g., the peripheral device is in an no-line state or in a stand-by state or in an abnormal state, however, the CPU transmits the corresponding information to the PC via the digital data signal and, when the user generates the reply communication signal for controlling the peripheral device through the PC, the CPU controls the call according to this signal.

For example, when the PC is turned off or the PC does not generate the reply communication signal although it is turned on, the CPU controls the calling. However, when the user generates the reply communication signal in order to discontinue the call of the analog telephone, the CPU discontinues the call of the analog telephone in response to the reply communication signal.

The reply communication signal is referred to as the signal which is transmitted to the CPU by the PC, for controlling the peripheral device such as a general telephone, the digital telephone, etc.

When the status of the peripheral device changes, e.g., the peripheral device is in an on-line state or in a stand-by state or in an abnormal state, the CPU transmits the corresponding information to the PC via the digital data signal. Thus, the user can understand the status of the peripheral device according to the above information. Further, the user generates the reply communication signal for controlling the peripheral device through the PC.

As described above, the present invention connects peripheral devices therebetween without using an additional modem port. Further, the present invention connects a digital telephone, a modem (or a facsimile machine) and a personal computer, to one module, so that a call can be effectively controlled by using the personal computer. In addition, the personal computer controls the calling in the present invention, thereby increasing the user's convenience.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A computer telephony integrated module system, comprising:

a computer interface;

a central processing unit receiving a reply communication signal via said computer interface from a computer in response to a data channel signal from said central processing unit, and outputting respective control signals for controlling two elements including a digital telephone and a peripheral device;

a first controller dividing said two audio channel signals into first and second audio channel signals, and providing said data channel signal received from a digital simple exchange system to said central processing unit;

a second controller connecting said first audio channel signal to the digital telephone in response to one of said control signals from said central processing unit; and a third controller converting said second audio channel signal into an analog signal and connecting said analog signal to the peripheral device in response to another of said control signals from said central processing unit.

2. The computer telephony integrated module system as recited in claim 1, with said first controller and said second controller each respectively comprising a digital adapter subscriber for loops.

3. The computer telephony integrated module system as recited in claim 1, with said third controller comprising:

a coder-decoder connecting said second audio channel signal to the peripheral device in response to said another control signal;

a ringer connected between the peripheral device and said central processing unit, generating a ring signal; and a hook sensor connected between the peripheral device and said central processing unit, sensing a hook on/off of the peripheral device.

4. The computer telephony integrated module system as recited in claim 2, said third controller comprising:

a coder-decoder connecting said second audio channel signal to the peripheral device in response to said another control signal;

a ringer connected between the peripheral device and said central processing unit, generating a ring signal; and a hook sensor connected between said peripheral device and said central processing unit, sensing a hook on/off of the peripheral device.

5. The computer telephony integrated module system as recited in claim 1, with the peripheral device comprising a facsimile machine.

6. The computer telephony integrated module system as recited in claim 2, with the peripheral device comprising a facsimile machine.

7. The computer telephony integrated module system as recited in claim 3, with the peripheral device comprising a facsimile machine.

8. The computer telephony integrated module system as recited in claim 4, with the peripheral device comprising a facsimile machine.

9. A method of connecting a digital simple exchange system to two elements, including a digital telephone and a peripheral device, said method comprising:

receiving a reply communication signal from a computer in response to a data channel signal from a central processing unit;

controlling the two elements including the digital telephone and the peripheral device by generating respective control signals from the central processing unit;

dividing two audio channel signals received from a digital simple exchange system in a first controller into first and second audio channel signals and providing a data channel signal received from the digital simple exchange system to the central processing unit;

connecting the first audio channel signal to the digital telephone with a second controller, in response to one of the control signals from the central processing unit;

converting the second audio channel signal into an analog signal and, in response to another of the control signals from the central processing unit, connecting the analog signal to the peripheral device with a third controller; and exchanging the data channel signal and the reply communication signal between the central processing unit and the computer using them to communicate.

10. A computer telephony integrated module system, comprising:

a computer interface;

a central processing unit receiving a reply communication signal via said computer interface from a computer in response to a data channel signal from said central processing unit, and outputting respective control signals for controlling peripheral devices that are individually and separately operationally coupled to said module system;

a controller dividing said two audio channel signals into first and second audio channel signals, and providing said data channel signal received from a digital simple exchange system to said central processing unit;

a controlling stage connecting said first audio channel signal to a first one of the peripheral devices in response to one of said control signals from said central processing unit, and converting said second audio channel signal into an analog signal and connecting said analog signal to a second one of the peripheral devices in response to another of said control signals from said central processing unit.

* * * * *